United States Patent
Neter et al.

(10) Patent No.: US 12,192,056 B2
(45) Date of Patent: *Jan. 7, 2025

(54) ASSIGNMENTS OF IOT DEVICE TYPES

(71) Applicant: Microsoft Technology Licensing, LLC, Redmond, WA (US)

(72) Inventors: Omer Neter, Kiryat Ono (IL); Ori Perez, Harotzim (IL); Yogev Shitrit, Herzliya (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/449,866

(22) Filed: Aug. 15, 2023

(65) Prior Publication Data
US 2024/0048447 A1 Feb. 8, 2024

Related U.S. Application Data

(63) Continuation of application No. 17/724,080, filed on Apr. 19, 2022, now Pat. No. 11,770,302.

(60) Provisional application No. 63/305,577, filed on Feb. 1, 2022.

(51) Int. Cl.
*G06F 15/173* (2006.01)
*G16Y 30/00* (2020.01)
*H04L 41/0893* (2022.01)

(52) U.S. Cl.
CPC .......... *H04L 41/0893* (2013.01); *G16Y 30/00* (2020.01)

(58) Field of Classification Search
CPC ........................... H04L 41/0893; G16Y 30/00
See application file for complete search history.

(56) References Cited

U.S. PATENT DOCUMENTS 11,770,302 B2 * 9/2023 Neter ................. H04L 41/0893
709/220

* cited by examiner

*Primary Examiner* — Joseph R Maniwang
(74) *Attorney, Agent, or Firm* — Mannava & Kang, P.C.

(57) ABSTRACT

According to examples, a processor may receive data pertaining to a communication sent over a network by a device, extract a set of characteristics associated with the communication from the received data, and determine whether the extracted set of characteristics meets a predefined similarity threshold with respect to a previously identified set of characteristics, in which the previously identified set of characteristics is assigned with a certain device type. The processor may also, based on a determination that the extracted set of characteristics meets the predefined similarity threshold with respect to the previously identified set of characteristics, assign the device with the certain device type.

20 Claims, 7 Drawing Sheets

TABLE OF PREVIOUSLY IDENTIFIED SETS OF
CHARACTERISTICS/FEATURES
116

FIG. 3

ASSIGNMENTS OF IOT DEVICE TYPES

RELATED APPLICATIONS

This application is a Continuation of commonly assigned and co-pending U.S. patent application Ser. No. 17/724,080 filed Apr. 19, 2022, which claims priority to U.S. Provisional Patent Application No. 63/305,577, filed on Feb. 1, 2022, the contents of which are incorporated by reference in their entireties herein.

BACKGROUND

Smart devices have been gaining in popularity and use over the years. In particular, Internet of things ("IoT") devices, continue to be developed and used. IoT devices may be defined as nonstandard computing devices that may connect to a network and have the ability to transmit data. Standard computing devices may be desktop computers, laptop computers, smartphones, and tablet computers. Non-standard computing devices (IoT devices) may include, just to name a small number of devices, cameras, wearables, smart appliances, toys, and sensors. Some types of IoT devices may connect to a network wirelessly, while other types of IoT devices may have wired connections to the network.

BRIEF DESCRIPTION OF DRAWINGS

Features of the present disclosure are illustrated by way of example and not limited in the following figure(s), in which like numerals indicate like elements, in which:

FIG. 3 depicts an example of a table of previously identified sets of characteristics/features, in accordance with an embodiment of the present disclosure;

DETAILED DESCRIPTION

Figure 1:
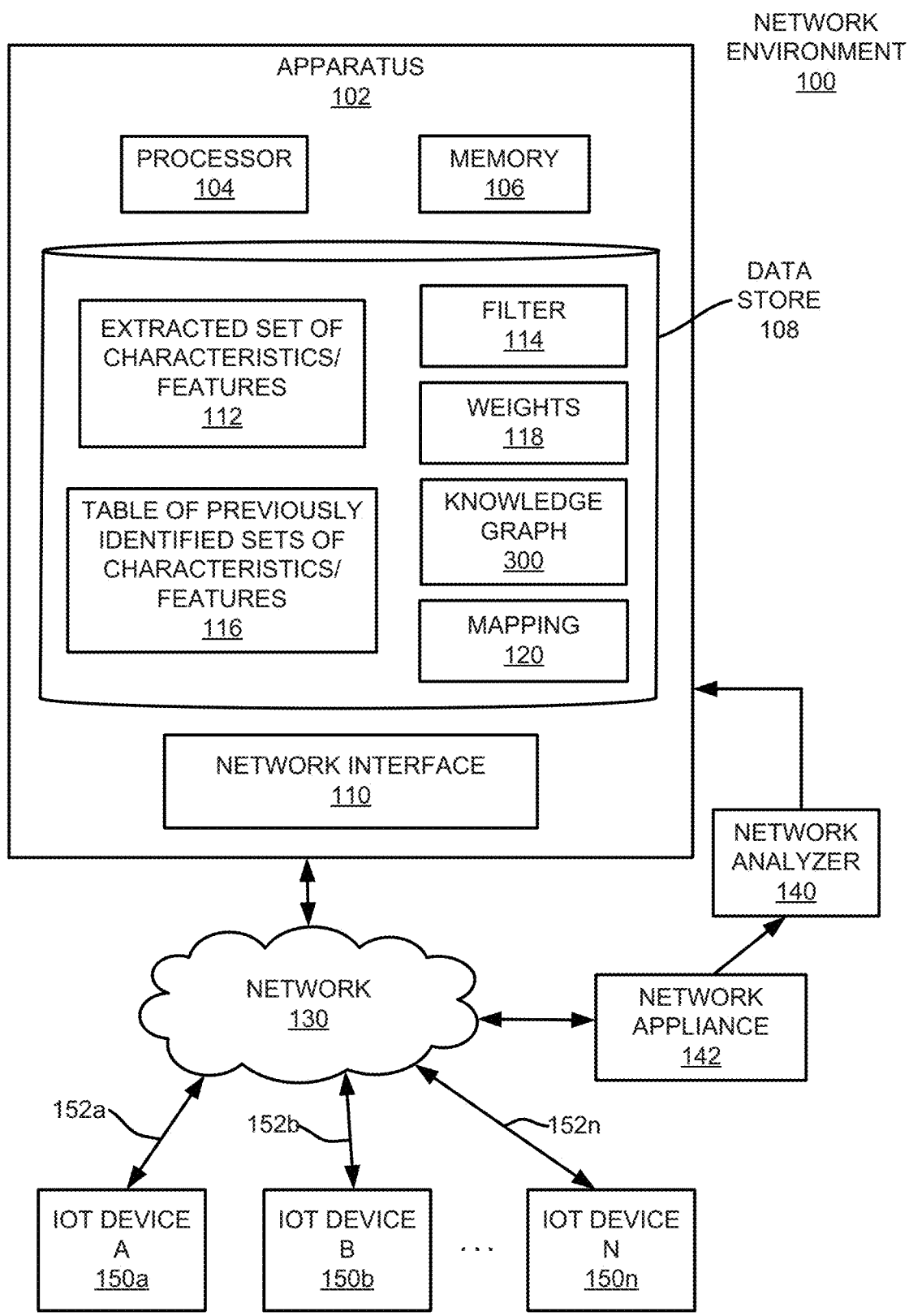
FIG. 1 shows a block diagram of a network environment, in which an apparatus may assign a device, e.g., an IoT device, with a device type based on a determined similarity of a set of characteristics associated with a communication by the device to another device over a network, in accordance with an embodiment of the present disclosure.

For simplicity and illustrative purposes, the principles of the present disclosure are described by referring mainly to embodiments and examples thereof. In the following description, numerous specific details are set forth in order to provide an understanding of the embodiments and examples. It will be apparent, however, to one of ordinary skill in the art, that the embodiments and examples may be practiced without limitation to these specific details. In some instances, well known methods and/or structures have not been described in detail so as not to unnecessarily obscure the description of the embodiments and examples. Furthermore, the embodiments and examples may be used together in various combinations.

Throughout the present disclosure, the terms "a" and "an" are intended to denote at least one of a particular element. As used herein, the term "includes" means includes but not limited to, the term "including" means including but not limited to. The term "based on" means based at least in part on.

IT personnel of organizations may track the IoT devices, including the types of the tracked IoT devices, that are connected to their networks. The IT personnel may track the IoT devices for security purposes. For instance, the IT personnel may determine the identifications of and device types of IoT devices connected to their networks to prevent unauthorized IoT devices from being connected to their networks, to prevent malicious activity from originating from IoT devices that may be infected with malicious code, and/or the like. The IT personnel may also determine the IoT devices connected to their networks to ensure that software and/or firmware updates are properly installed on the IoT devices.

In many instances, members of organizations may connect IoT devices to the networks of the organizations without informing the IT personnel of the connections. In addition, many of the IoT devices may not be configured to receive queries and/or provide their identifications. As a result, the IT personnel may not determine the IoT devices connected to their networks, or the types of the IoT devices, by querying the IoT devices. Instead, the IT personnel may manually identify the connected IoT devices themselves and/or may rely on the members of the organizations to provide information regarding the IoT devices. As the manual identification of the connected IoT devices may be prone to human error, these processes may fail to account for all of the connected IoT devices and thus, may result in inaccurate determinations of the connected IoT devices and/or their device types. This may result in potential security issues and the failure to timely update the IoT devices. A technical issue associated with known IoT device tracking techniques may thus be that the networks of organizations may not adequately be protected from potentially malicious actors because, for instance, the IoT devices may not properly be identified and thus, the IoT devices may not properly be updated with the latest security software and/or firmware.

Disclosed herein are apparatuses, methods, and computer-readable mediums that may enable a processor to identify and assign device types to IoT devices based on analyses of characteristics associated with communications made by the IoT devices over networks. Particularly, the processor may determine whether an extracted set of characteristics associated with a communication from an IoT device meets a predefined similarity threshold with respect to a previously identified set of characteristics. Based on a determination that the extracted set of characteristics meets the predefined similarity threshold, the processor may assign the IoT device with a certain device type corresponding to the previously identified set of characteristics.

However, based on a determination that the extracted set of characteristics does not meet the predefined similarity threshold with respect to any of a plurality of previously identified sets of characteristics, the processor may query a knowledge graph for identification of a cluster of characteristics that includes at least some of the extracted set of characteristics. The cluster of characteristics may be one of a plurality of clusters of characteristics in the knowledge graph and each of the plurality of clusters of characteristics may include a device type. In addition, the processor may assign the device type in the cluster of characteristics that most closely meets the query as the device type of the IoT device.

Through implementation of features of the present disclosure, a processor may automatically determine and assign device types to the IoT devices connected to a network. The processor may thus accurately and efficiently assign the device types to the IoT devices connected to the network. The assignment of the device types to the IoT devices may be efficient because the processor may analyze available information from communications by the IoT devices and thus, may not need to obtain additional information to determine the device types. This may enable the processor to make the determinations while reducing or minimizing energy and/or processing resource usage. In addition, the accurate determination and assignment of the device types to the IoT devices may enable the IoT devices to be updated with the latest firmware and/or software, which may enhance security on the IoT devices. Technological benefits afforded through implementation of the features of the present disclosure may thus include enhanced security on the IoT devices and the networks to which the IoT devices are connected as well as reduced energy and processing resource usage to identify the device types of the IoT devices.

Figure 2:
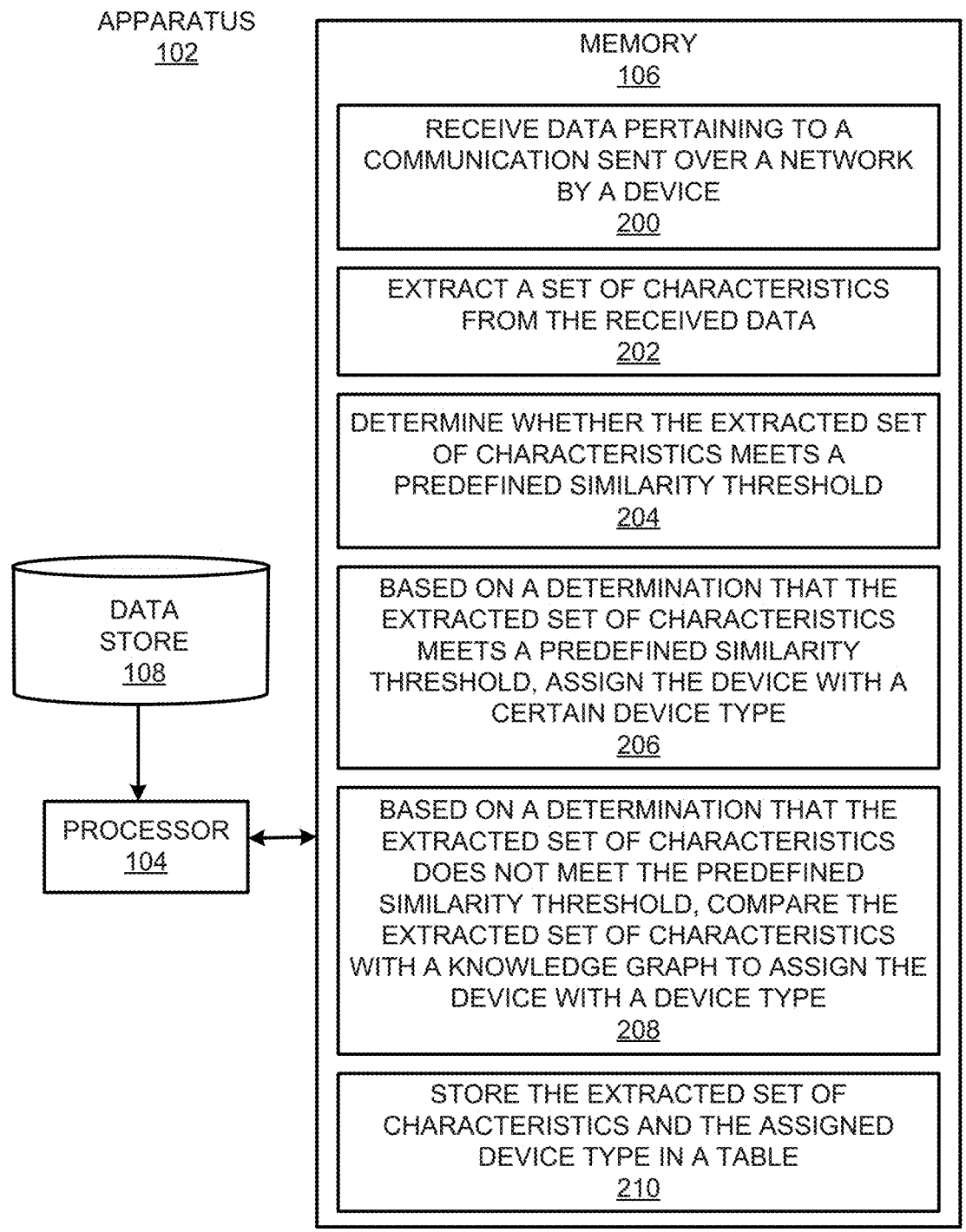
FIG. 2 depicts a block diagram of the apparatus depicted in FIG. 1, in accordance with an embodiment of the present disclosure.

Reference is first made to FIGS. 1 and 2. FIG. 1 shows a block diagram of a network environment 100, in which an apparatus 102 may assign a device, e.g., an IoT device, with a device type based on a determined similarity of a set of characteristics associated with a communication by the device to another device over a network, in accordance with an embodiment of the present disclosure. FIG. 2 depicts a block diagram of the apparatus 102 depicted in FIG. 1, in accordance with an embodiment of the present disclosure. It should be understood that the network environment 100 and/or the apparatus 102 may include additional features and that some of the features described herein may be removed and/or modified without departing from the scopes of the network environment 100 and/or the apparatus 102.

As shown in FIG. 1, the network environment 100 may include the apparatus 102, which may include a processor 104, a memory 106, a data store 108, and a network interface 110. The apparatus 102 may be a computing device such as a server, a laptop computer, a desktop computer, a tablet computer, and/or the like. In particular examples, the apparatus 102 is a server on the cloud. In some examples, functionalities of the apparatus 102 may be spread over multiple apparatuses 102, multiple virtual machines, and/or the like.

The processor 104 may control operations of the apparatus 102 and may be a semiconductor-based microprocessor, a central processing unit (CPU), an application specific integrated circuit (ASIC), a field-programmable gate array (FPGA), and/or other hardware device. References made herein to the apparatus 102 performing various operations should equivalently be construed as meaning that the processor 104 of the apparatus 102 may perform those various operations.

The memory 106 may have stored thereon instructions that the processor 104 may access and/or may execute may be stored. In addition, the processor 104 may store and access various information in the data store 108. The memory 106 and the data store 108, which may also each be termed a computer-readable medium, may each be, for example, a Random Access memory (RAM), an Electrically Erasable Programmable Read-Only Memory (EEPROM), a storage device, or the like. The memory 106 and/or the data store 108 may be a non-transitory computer-readable storage medium, where the term "non-transitory" does not encompass transitory propagating signals. In any regard, the memory 106 may have stored thereon machine-readable instructions that the processor 104 may execute. The data store 108 may have stored thereon data that the processor 104 may enter or otherwise access.

Although the apparatus 102 is depicted as having a single processor 104, it should be understood that the apparatus 102 may include additional processors and/or cores without departing from a scope of the apparatus 102. In this regard, references to a single processor 104 as well as to a single memory 106 may be understood to additionally or alternatively pertain to multiple processors 104 and/or multiple memories 106. In addition, or alternatively, the processor 104 and the memory 106 may be integrated into a single component, e.g., an integrated circuit on which both the processor 104 and the memory 106 may be provided. In addition, or alternatively, the operations described herein as being performed by the processor 104 may be distributed across multiple apparatuses 102 and/or multiple processors 104.

The network interface 110 may include software and/or hardware through which the apparatus 102 may send and receive data via a network 130. The network 130 may be an internal network, such as a local area network, an external network, such as the Internet, or a combination thereof. For instance, the apparatus 102 may receive data from a network analyzer 140 through the network 130. In other examples, however, the network analyzer 140 may communicate with the apparatus 102 in another manner. For instance, the network analyzer 140 may be directly connected to the apparatus 102 and/or the network analyzer 140 may communicate with the apparatus 102 via another network, such as a local area network.

The network analyzer 140 may access communications and/or interactions by devices on the network 130. The communications and/or interactions may include communications of IP packets communicated by the devices to other devices through the network 130. For instance, the network analyzer 140 may access communications that flow through a network appliance 142 in the network 130. The network appliance 142 may be a router, a switch, a server, a firewall, and/or the like. The network analyzer 140 may use any of a span port, port mirroring, a tap, or the like, to access the communications through the network appliance 142. In addition, the network analyzer 140 may forward the information, e.g., header information contained in the IP packets to the apparatus 102.

The network environment 100 may also include a plurality of IoT devices 150a-150n (in which the variable "n" may denote a value greater than one) that may communicate data through the network 130. The IoT devices 150a-150n may be nonstandard computing devices, such as any of smart cameras, wearables, smart appliances, toys, sensors, thermostats, smart televisions, smart door locks, and/or the like. In some examples, the IoT devices 150a-150n may send communications 152a-152n (which are also termed interactions herein) to other devices through the network 130. For instance, the IoT devices 150a-150n may send communications 152a-152n to other IoT devices 150a-150n, to servers, to data storage devices, and/or the like. The communications 152a-152n may be IP packets and may include a plurality of characteristics (which may also be termed features herein).

According to examples, the network analyzer 140 may access the information contained in the communications 152a-152n. For instance, the network analyzer 140 may access the header information contained in the communications 152a-152n, e.g., header information in IP packets. The information contained in the communications 152a-152n may include, for instance, port information, source IP addresses, destination IP addresses, MAC addresses, vendor information, application types, application versions, firmware versions, models, hostnames, and/or the like. The network analyzer 140 may communicate the information to the apparatus 102.

In some examples, the network analyzer 140 may be separate from the network appliance 142. In these examples, the network analyzer 140 may be a separate device that may be in communication with the network appliance 142. In some examples, the network analyzer 140 may be integral with the apparatus 102. In other examples, the network analyzer 140 may be integral with the network appliance 142.

As shown in FIG. 2, the memory 106 may have stored thereon machine-readable instructions 200-210 that the processor 104 may execute. As shown, the processor 104 may execute the instructions 200 to receive data pertaining to a communication 152a sent over a network 130 by a device 150a, e.g., an IoT device 150a. According to examples, the data pertaining to the communication 152a may include the information contained in the header of IP data packets in the communication 152a. In addition, the processor 104 may receive the data pertaining to the communication 152a from the network analyzer 140.

The processor 104 may execute the instructions 202 to extract a set of characteristics 112 (which is also referenced herein as features 112) associated with the communication 152a from the received data. The characteristics may include the information contained in the header of the communication 152a as discussed herein. In some examples, the extracted set of characteristics 112 may be interesting characteristics contained in the communication 152a. For instance, the extracted set of characteristics 112 may be characteristics that may provide useful insight into identifying a device type of the device 150a. In some examples, the processor 104 may apply a filter 114 to the characteristics contained in the received data to extract the set of characteristics 112 from the received data. The filter 114 may be used, for instance, to filter out the characteristics that are not relevant in identifying the device type of the device 150a. The device type of the device 150a may identify the type of the device 150a, e.g., whether the device 150a is a sensor, a television, a door lock, etc.

In some examples, the filter 114 may be a regular expression (regex) that the processor 104 may apply on the characteristics in the received data to extract the set of characteristics 112. In some examples, a user, e.g., an analyst, a programmer, and IT personnel, and/or the like, may have written the regex to extract the set of characteristics 112 that are the most relevant in identifying the device type of the device 150a. The user may provide the regex to the processor 104 to use in extracting the set of characteristics 112. In one regard, the extracted set of characteristics 112 may include a subset of the characteristics included in the received data.

In some examples, the processor 104 may normalize the extracted set of characteristics 112. In some instances, the received data and the extracted set of characteristics 112 may include a relatively large set of long strings of data, such as strings of words. The processor 104 may normalize the extracted set of characteristics 112 by adding additional information to the long strings of data. For instance, the processor 104 may apply a process of structurization to the long strings of data, which may be unstructured data, to be structured data. The processor 104 may also add some additional information to the structured data to normalize the data.

The processor 104 may execute the instructions 204 to determine whether the extracted set of characteristics 112 meets a predefined similarity threshold with respect to a previously identified set of characteristics. The previously identified set of characteristics may be stored in a table of previously identified sets of characteristics/features 116 (hereinafter referenced as a table 116). An example of such a table 116 is depicted in FIG. 3. The table 116 is depicted as being broken upon into two sections in order to fit all of the data in the table 116 within the figure. Accordingly, it should be understood that the bottom portion extends from the upper portion of the table 116 as indicated by the arrow.

As shown, each of the rows in the table 116 may include a set of characteristics for a particular IoT device 150b-150n. In the example table 116, the characteristics are vendor, application, app2ver, model friendly name, application version, firmware version, device type, and tagged profile. It should be understood that the characteristics depicted in the table of FIG. 3 are for purposes of illustration and not of limitation. Accordingly, the table 116 may list other types of characteristics without departing from a scope of the present disclosure. In some examples, a user, e.g., an analyst, an IT personnel, or the like, may have determined the device types of the IoT devices 150b-150n based on the sets of characteristics obtained for those IoT devices 150b-150n. The user may have also inputted the device types corresponding to the IoT devices 150b-150n into the table 116. The tagged profiles of the IoT devices 150b-150n may each include the characteristics contained in respective rows of the table 116.

According to examples, the processor 104 may add the extracted set of characteristics as an entry into a row of a table 116. For instance, the processor 104 may add the extracted set of characteristics as a new row in the table 116 in appropriate columns of the table 116. In some examples, the processor 104 may compare the extracted set of characteristics 112 against the sets of characteristics of the previously identified set of characteristics. The processor 104 may also determine similarity levels between the extracted set of characteristics 112 and the sets of characteristics of the previously identified set of characteristics. The processor 104 may use any suitable similarity determination technique to determine the similarity levels. In the following examples, "A" may represent the extracted set of characteristics 112 and "B" may represent the set of characteristics in a particular row of the table 116.

For instance, the processor 104 may determine an un-weighted Jaccard similarity, e.g., $$f_1 = \frac{|A \cap B|}{|A \cup B|}.$$

As another example, the processor 104 may determine a weighted Jaccard similarity, e.g., $$f_2 = \frac{\sum_{x,y \in A \cap B} \min(x, y)}{\sum_{x,y \in A \cup B} \max(x, y)}.$$

As another example the processor 104 may determine an unweighted cosine similarity, e.g., $$f_3 = \frac{|A \cap B|}{\sqrt{|A||B|}}.$$

As another example, the processor 104 may determine a weighted cosine similarity, e.g., $$f_4 = \frac{\sum_{x,y \in A \cap B} x \cdot y}{\left(\sum_{x \in A} x^2\right) \cdot \left(\sum_{y \in B} y^2\right)}.$$

As a further example, the processor 104 may determine an unweighted overlap similarity, e.g., $$f_5 = \frac{|A \cap B|}{\min(|A|, |B|)}.$$

As a yet further example, the processor 104 may determine any weighted combination of the previously identified techniques, e.g., $f_6 = w_1 \cdot f_i + w_2 \cdot f_j$, such that $w_1$, $w_2$ is between 0 to 1, and $i \neq j$.

In some examples, the processor 104 may identify weights 118 to be applied to at least one of the characteristics in the extracted set of characteristics 112. In addition, the processor 104 may apply the weights 118 on at least one of the characteristics in the extracted set of characteristics 112. The weights 118 may correspond to levels at which the characteristics are relevant in identifying a device type of the device 150a. That is, the characteristics having the highest relevance in identifying the device type of the device 150a may have the highest weight. For instance, a vendor of the device 150a may have a higher weight than some application version identified in the communication 152a sent by the device 150a. In some examples, an analyst may define the weights assigned to the characteristics, for instance, as values between 0 and 1, as values between 0 and 10, as values between 1 and 9, and/or the like.

In some examples, the weights 118 assigned to the characteristics may be used to determine the level of similarity between the extracted set of characteristics 112 and the previously identified set of characteristics. For instance, similarities between characteristics having higher weights may have a greater effect on the similarity determinations. As an example, the processor 104 may determine whether the extracted set of characteristics 112 with the weights 118 applied on at least one of the characteristics meets the predefined similarity threshold with respect to any of the previously identified sets of characteristics. In addition, the processor 104 may, based on a determination that the extracted set of characteristics 112 with the weights 118 applied on at least one of the characteristics meets that predefined similarity threshold with respect to a previously identified set of characteristics, assign the device 150a with the certain device type of that previously identified set of characteristics.

The processor 104 may execute the instructions 204 to determine whether the extracted set of characteristics 112 meets a predefined similarity threshold with respect to a previously identified set of characteristics. In some examples, the processor 104 may determine which of the previously identified set of characteristics most closely matches the extracted set of characteristics 112 based on the comparisons. In these examples, the processor 104 may determine whether the previously identified set of characteristics that most closely matches the extracted set of characteristics 112 meets the predefined similarity threshold. In some examples, the processor 104 may determine whether the extracted sets of characteristics meet the predefined similarity threshold with respect to any of the previously identified sets of characteristics listed in the table 116. In any of these examples, the predefined similarity threshold may be user-defined, based on an analysis of historical data, through use of modeling, and/or the like.

The processor 104 may execute the instructions 206 to, based on a determination that the extracted set of characteristics 112 meets the predefined similarity threshold with respect to one of the previously identified sets of characteristics, assign the device 150a with the device type assigned to the previously identify set of characteristics. As discussed herein, the device type assigned to the previously identified set of characteristics may be included in the table 116. The processor 104 may obtain the device type from the table 116. In addition, the device type may be an indication or label of the type of the IoT device 150a, e.g., whether the IoT device 150a is a sensor, a camera, a smart TV, a thermostat, and/or the like.

The processor 104 may execute the instructions 208 to, based on a determination that the extracted set of characteristics 112 does not meet the predefined similarity threshold with respect to any of the previously identified sets of characteristics, compare the extracted set of characteristics 112 with clusters of characteristics in a knowledge graph, in which each of the clusters of characteristics includes a device type. The processor 104 may also identify the cluster of characteristics that most closely matches the extracted stet of characteristics 112. The processor 104 may further assign the device type of the cluster of characteristics that most closely matches the extracted set of characteristics 112 as the device type of the device 150a. In some examples, and as discussed herein, the processor 104 may generate the knowledge graph to include the clusters of characteristics.

Figure 4:
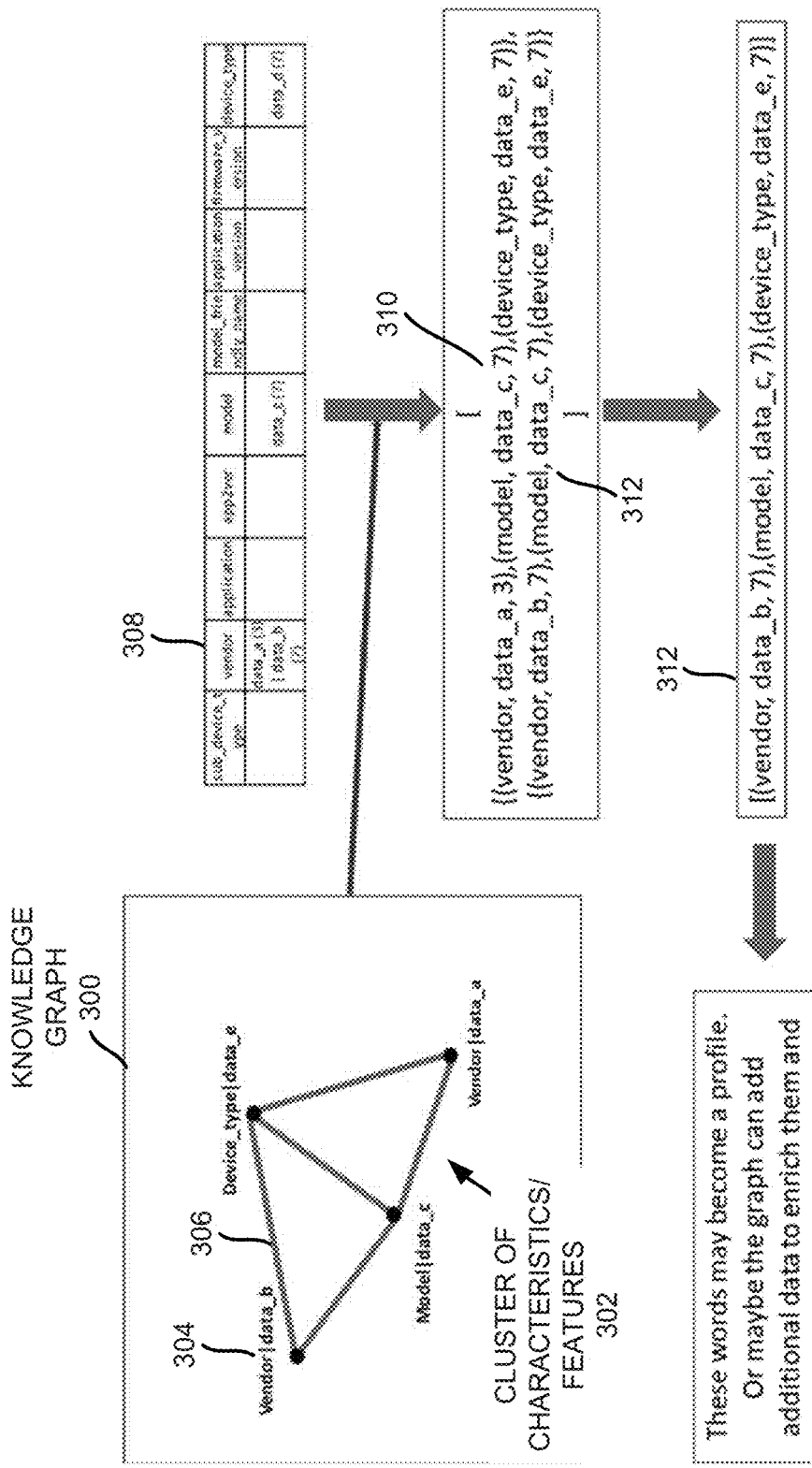
FIG. 4 depicts an example of a knowledge graph, in accordance with an embodiment of the present disclosure.

An example knowledge graph 300 is depicted in FIG. 4. As shown in FIG. 4, the knowledge graph 300 may include a cluster of characteristics/features 302. Although a single cluster of characteristics/features 302 has been depicted in FIG. 4 for purposes of illustration, it should be understood that the knowledge graph 300 may include any number of clusters of characteristics/features 302. For instance, the knowledge graph 300 may include a cluster of characteristics/features 302 corresponding to each row of characteristics in the table 116.

As shown, the cluster of characteristics/features 302 may include a plurality of nodes 304 and links (or edges) 306 that interconnect the nodes 304 together. Also shown in FIG. 4 are illustrations of a row of characteristics 308 that may have been used to create the cluster of characteristics/features 302 in the knowledge graph 300. In the row of characteristics 308, the numbers in the parentheses may denote the respective weights assigned to the characteristics. Additionally, because there are two vendors "data_a" having a weight of "3" and "data_b" having a weight of "7", there may be two possible profiles 310, 312. The profile 312 having the highest weighed characteristics may be identified as the profile for the cluster of characteristics/features 302. Although not shown, the cluster of characteristics/features 302 may be enriched with additional data, for instance, through addition of characteristics provided by a user to create a higher quality profile 312 for the cluster of characteristics/features 302.

In some examples, a determination that the extracted set of characteristics 112 does not meet the predefined similarity threshold may mean that some words in the given row (e.g., a row intended to be assigned a profile, such as a row in the table 116 that includes the extracted set of characteristics 112) may not exist in the table 116 of tagged profiles, or a specific combination of words has not yet been tagged by an analyst. In this case, the processor 104 may still return a reasonable device type for the device 150a, for instance, until an analyst assigns a device type to the device 150a. By way of non-limiting example in which the following set of characteristics were extracted from a communication 152a by the device 150a:

| sub_device_type | Vendor | Application | app2ver | model | model_friendly_name | application_version | firmware_version |
|---|---|---|---|---|---|---|---|
| data_ab (8) | data_aa (4)\| data_y (6)\| data_z (8) | data_ai (2)\| data_aj (1) | data_ah_0.0 (2)\|data_aj_0.0 (1) | data_m (8) | data_m (8) | | data_q (6) |

Additionally, the similarity threshold was less than 0.7, e.g., less than the predefined similarity threshold.

The processor 104 may use a "max clique" algorithm, which may mean that the algorithm induces a partition of maximum sized classes to all of the words in the row. An example of the use of a "max clique" algorithm is as follows: [{data_ab (8), data_aa (4), data_q (6)}, {data_y (6)}, {data_z (8), data_m (8)} . . . ] The processor 104 may perform the partition in such a way that a class contains only words that are inter-connected to each other, e.g., they form a sub-graph called a clique/full graph. In some examples, the knowledge graph 300 may be constructed in this manner. Additionally, a check may be performed on the knowledge graph 300 to check whether a set of nodes 304 (for instance, words) are inter-connected. The check may be performed as follows:

An x number of words (nodes 304) may be determined to be interconnected (e.g., form a clique/full graph) if the number of edges (the links 306) between them is equal to $$\frac{x \cdot (x-1)}{2}.$$

As a result, connections between the words in the knowledge graph 300 may be verified.

The processor 104 may then choose the class that contains the highest weighted word. If two classes have different words with the same weight, the processor 104 may choose the class by averaging the weights. From the entire set of words, a specific class may remain, for instance, [{data_z (8), data_m (8)}]. These words may not be enough for the processor 104 to identify at least a feature of the device 150a. However, the processor 104 may query the knowledge graph 300 for specific enrichments when possible. For example, a vendor and a model of a device may be good characteristics for determining the device type. As such, the processor 104 may "ask" the graph: "what device type is connected to these vendor and model?" If the result is unique, and is connected to the vendor and model, the processor 104 may add the result to the list of words that eventually forms the device profile of device 150a.

In some examples, both the table 116 and the knowledge graph 300 may be used to determine the device type and/or the device profile of a device 150a. The table 116 may include rows that were assigned a profile. These profiles may contain more information about the device that the analyst added. For example, the words in the row may not include an operating system of a device 150a. However, an analyst may conclude that a specific model of phones with a certain vendor may only be with a certain operating system. In other words, the analyst may have made a "human enrichment". The analyst may potentially add more valuable information to the profile in this example. Secondly, the knowledge graph 300 may be built from the entire data, e.g., the tagged and the untagged data. In that sense, the table information is contained in the knowledge graph 300, but the information may be organized differently, in that they may not be used for the same purpose. The knowledge graph 300 may be a mechanism that gives the processor 104 the ability to make a best guess in case the processor 104 is unable to determine the device type with sufficient certainty from the table 116.

The processor 104 may execute the instructions 210 to store the extracted set of characteristics 112 and the assigned device type in the table 116. For instance, the last row in table 116 may represent the extracted set of characteristics 112 and the assigned device type for the device 150a. The row corresponding to the device 150a may also include a tagged profile of the device 150a. As shown, the tagged profile of the device 150a may include the extracted set of characteristics 112 and the assigned device type for the device 150a.

The processor 104 may repeat the instructions 200-210 for newly received data to update the table 116 with all of the devices 150a-150n connected to a network of an organization. In some examples, the processor 104 may generate a mapping 120 of a plurality of devices 150a-150n in a network 130 according to the device types of the extracted set of characteristics and the previously identified sets of characteristics. The processor 104 may output the generated mapping 120 of the plurality of devices 150a-150n to, for instance, an owner, operator, IT personnel, or the like, of an organization within which the devices 150a-150n may be used. As such, the owner, operator, IT personnel, or the like, of an organization may identify the device profiles of some or all of the devices 150a-150n, e.g., IoT devices 150a-150n, being used in the organization. The device profiles may include, for instance, firmware versions, application versions, etc., and thus, when updates, such as updates to security is to be made, the owner, operator, IT personnel, or the like of the organization may determine that the updates are to be implemented. Through implementation of features of the present disclosure, therefore, updating of software and/or firmware in the devices 150a-150n may be enhanced. In addition, as the device types and device profiles of some or most of the devices 150a-150n may automatically be determined by the processor 104, the amount of energy and resources consumed in making these determinations through other more rigorous manners may be reduced or minimized. Moreover, the technical features of the present disclosure provide accurate determination of IoT device 150a-150n types, even of IoT devices that are unable to be queried and/or to provide responses with their device types.

Although the instructions 200-210 are described herein as being stored on the memory 106 and may thus include a set of machine-readable instructions, the apparatus 102 may include hardware logic blocks that may perform functions similar to the instructions 200-210. For instance, the processor 104 may include hardware components that may execute the instructions 200-210. In other examples, the apparatus 102 may include a combination of instructions and hardware logic blocks to implement or execute functions corresponding to the instructions 200-210. In any of these examples, the processor 104 may implement the hardware logic blocks and/or execute the instructions 200-210. As discussed herein, the apparatus 102 may include additional instructions and/or hardware logic blocks such that the processor 104 may execute operations in addition to or in place of those discussed above with respect to FIG. 2.

Figure 5A:
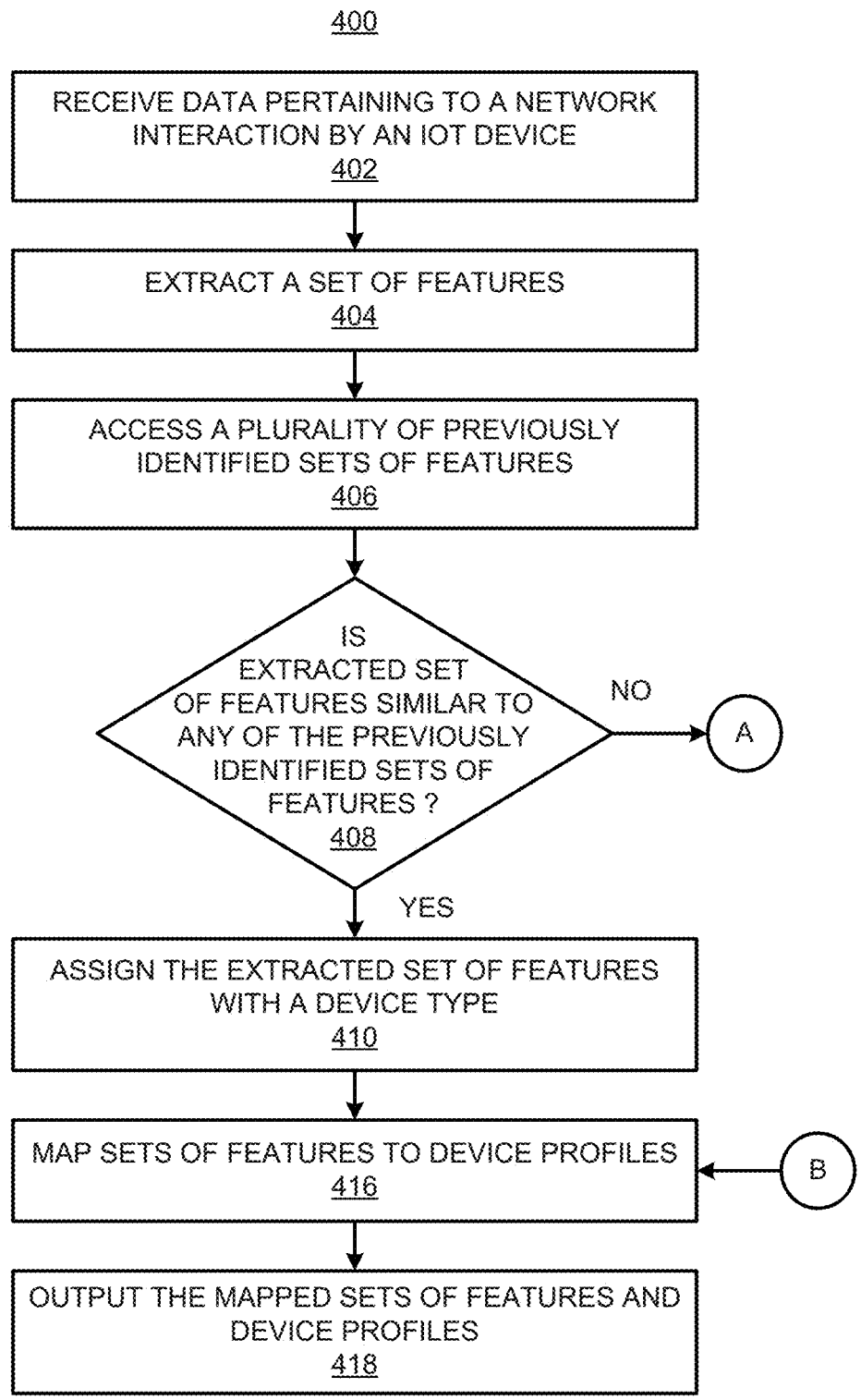
FIGS. 5A and 5B, collectively, depict a flow diagram of a method for assigning an IoT device with a device type based on a similarity of a set of characteristics associated with an interaction by the IoT device with another device over a network, in accordance with an embodiment of the present disclosure.
Figure 5B:
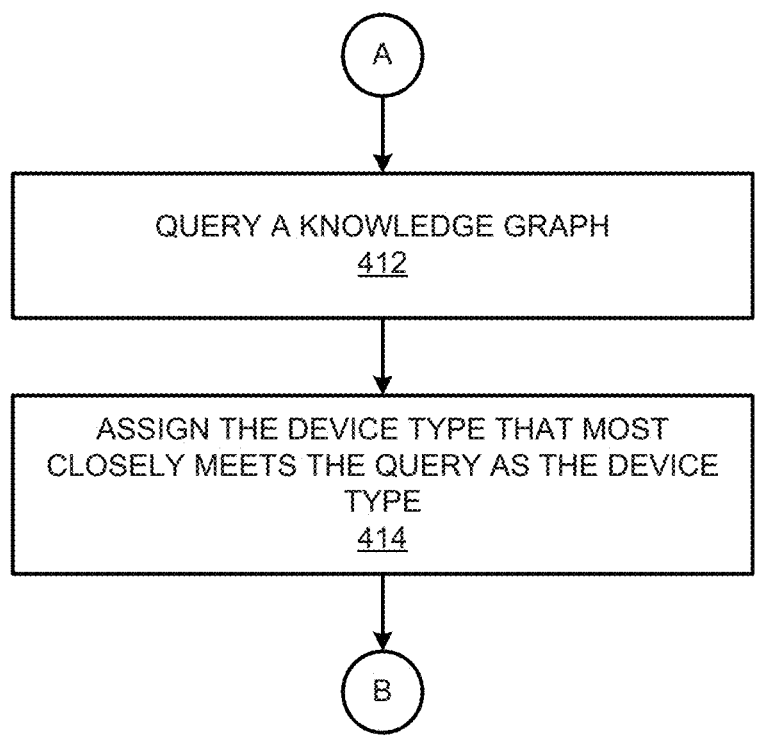

Various manners in which the processor 104 of the apparatus 102 may operate are discussed in greater detail with respect to the method 400 depicted in FIGS. 5A and 5B. Particularly, FIGS. 5A and 5B, collectively, depict a flow diagram of a method 400 for assigning an IoT device 150a with a device type based on a similarity of a set of characteristics 112 associated with an interaction 152a by the IoT device 150a with another device over a network 130, in accordance with an embodiment of the present disclosure. It should be understood that the method 400 may include additional operations and that some of the operations described therein may be removed and/or modified without departing from the scope of the method 400. The description of the method 400 is made with reference to the features depicted in FIGS. 1-4 for purposes of illustration.

At block 402, the processor 104 may receive data pertaining to a network interaction 152a by an Internet of Things (IoT) device 150a. At block 404, the processor 104 may extract a set of features 112 associated with the interaction 152a from the received data. At block 406, the processor 104 may access a plurality of previously identified sets of features corresponding to other IoT devices 150b-150n, the plurality of previously identified sets of features being assigned with respective device type. At block 408, the processor 104 may determine whether the extracted set of features 112 is similar to any of the previously identified sets of features within a predefined similarity threshold. At block 410; the processor 104 may, based on a determination that the similarity is within the predefined similarity threshold of a certain previously identified set of features, assign the extracted set of features 112 corresponding to the IoT device 150a with the device type of the certain previously identified set of features.

However, based on a determination that the extracted set of features 112 does not meet the predefined similarity threshold with respect to any of the plurality of previously identified sets of features, at block 412 (FIG. 5B), the processor 104 may query a knowledge graph 300 for identification of a cluster of features 302 that includes at least some of the extracted set of features. The cluster of features 302 may be one of a plurality of clusters of features in the knowledge graph 300, and each of the plurality of clusters of features may include a device type. In some examples, the processor 104 may query the knowledge graph 300 for identification of a cluster of features that includes at least some of the characteristics having the highest weights. The processor 104 may also, at block 414, assign the device type in the cluster of features that most closely meets the query as the device type of the device 150a. In some examples, the processor 104 may construct the knowledge graph 300 as discussed herein.

With reference back to FIG. 5A, at block 416, following either block 410 or 414, the processor 104 may map sets of features to device profiles. In addition, at block 418, the processor 104 may output the mapped sets of features and device profiles.

Some or all of the operations set forth in the method 400 may be included as utilities, programs, or subprograms, in any desired computer accessible medium. In addition, the method 400 may be embodied by computer programs, which may exist in a variety of forms both active and inactive. For example, they may exist as machine-readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Figure 6:
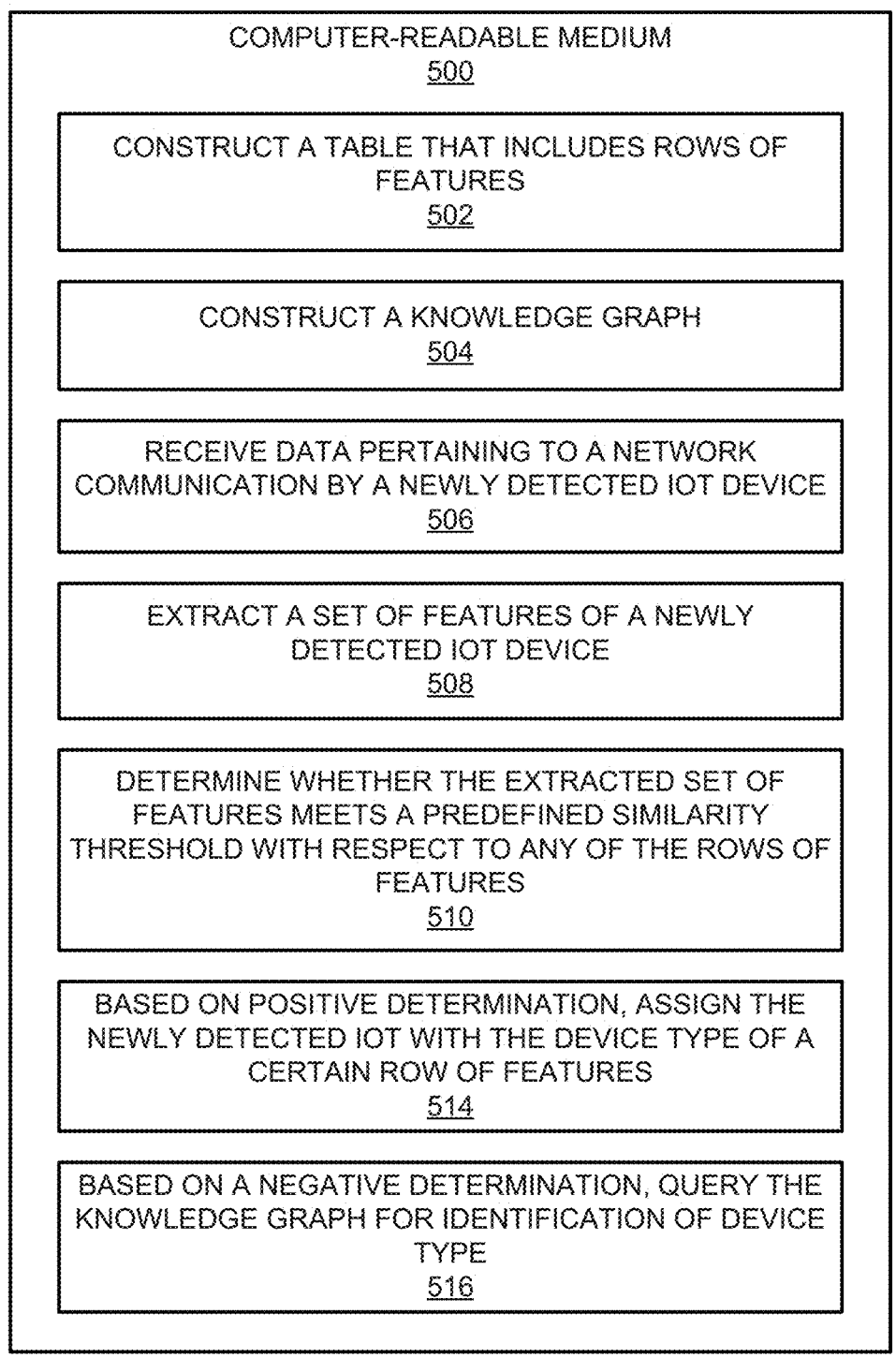
FIG. 6 shows a block diagram of a computer-readable medium that may have stored thereon computer-readable instructions to construct a table and a knowledge graph that a processor may use to determine device types for devices in a network, in accordance with an embodiment of the present disclosure.

Turning now to FIG. 6, there is shown a block diagram of a computer-readable medium 500 that may have stored thereon computer-readable instructions to construct a table and a knowledge graph that a processor may use to determine device types for devices 150a-150n in a network, in accordance with an embodiment of the present disclosure. It should be understood that the computer-readable medium 500 depicted in FIG. 5 may include additional instructions and that some of the instructions described herein may be removed and/or modified without departing from the scope of the computer-readable medium 500 disclosed herein. The computer-readable medium 500 may be a non-transitory computer-readable medium, in which the term "non-transitory" does not encompass transitory propagating signals.

The computer-readable medium 500 may have stored thereon computer-readable instructions 502-516 that a processor, such as the processor 104 of the apparatus 102 depicted in FIGS. 1 and 2, may execute. The computer-readable medium 500 may be an electronic, magnetic, optical, or other physical storage device that contains or stores executable instructions. The computer-readable medium 500 may be, for example, Random Access memory (RAM), an Electrically Erasable Programmable Read-Only Memory (EEPROM), a storage device, an optical disc, and the like.

The processor may fetch, decode, and execute the instructions 502 to construct a table 116 that includes rows of features, in which each of features in the rows of features corresponds to a feature of a communication 152a-152n over a network 130 by an Internet of Things (IoT) device 150a-150n and an indication of a device type of the IoT device 150a-150n. The processor may fetch, decode, and execute the instructions 504 to construct a knowledge graph 300 that includes clusters of features 302. Each cluster of features 302 may include a plurality of nodes 304 corresponding to an IoT device 150a-150n, in which each of the plurality of nodes 304 may identify a feature of a communication 152a (or interaction) over the network 130 by an IoT device 150a. In addition, one of the features (nodes 304) in each of the clusters of features 302 may be a device type assigned to the cluster of features 302. In some examples, for each of the clusters of features 302, the processor may interconnect features (nodes 304) that have at least a predefined minimum weight with links 306, in which the weights 118 correspond to levels at which features are relevant to an identification of device types of the IoT devices 150a-150n.

The processor may fetch, decode, and execute the instructions 506 to receive data pertaining to a network communication 152a of a newly detected IoT device 150a. The processor may fetch, decode, and execute the instructions 508 to extract a set of features 112 associated with the network communication 152a from the received data. The processor may fetch, decode, and execute the instructions 510 to determine whether the extracted set of features 112 meets a predefined similarity threshold with respect to any of the rows of features in the constructed table 116. The processor may fetch, decode, and execute the instructions 514 to, based on a determination that the extracted set of features 112 meets the predefined similarity threshold with respect to a certain row of features, assign the newly detected IoT device 150a with the device type of the certain row of features.

However, the processor may fetch, decode, and execute the instructions 514 to, based on a determination that the extracted set of features 112 fails to meet the predefined similarity threshold with respect to any of the rows of features, query the knowledge graph 300 for identification of a cluster of features 302 that includes at least some of the extracted set of features. As discussed herein, the cluster of features 302 may be one of a plurality of clusters of features in the knowledge graph 300 and each of the plurality of clusters of features 302 may include a device type. The processor may also assign the device type in the cluster of features 302 that most closely meets the extracted set of features as the device type of the device.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
   a processor; and
   a memory on which is stored machine-readable instructions that when executed by the processor, cause the processor to:
   receive data pertaining to a communication sent over a network by a device;
   extract a set of characteristics associated with the communication from the received data;
   determine whether the extracted set of characteristics meets a predefined similarity threshold with respect to a previously identified set of characteristics, wherein the previously identified set of characteristics is assigned with a certain device type; and
   based on a determination that the extracted set of characteristics does not meet the predefined similarity threshold with respect to any of a plurality of previously identified sets of characteristics,
   query a knowledge graph for identification of a cluster of characteristics that includes at least some of the extracted set of characteristics, wherein the cluster of characteristics is one of a plurality of clusters of characteristics in the knowledge graph, and wherein each of the plurality of clusters of characteristics includes a device type; and
   assign the device type in the cluster of characteristics that most closely meets the query as the device type of the device.

2. The apparatus of claim 1, wherein the instructions cause the processor to:
   based on a determination that the extracted set of characteristics meets the predefined similarity threshold with respect to the previously identified set of characteristics, assign the device with the certain device type.

3. The apparatus of claim 1, wherein the instructions cause the processor to:
   query the knowledge graph for identification of a cluster of characteristics that includes at least some of the characteristics having the highest weights.

4. The apparatus of claim 1, wherein the instructions cause the processor to:
   identify weights to be applied to at least one of the characteristics in the extracted set of characteristics, wherein the weights correspond to levels at which the characteristics are relevant in identifying a device type of the device; and
   apply the weights on at least one of the characteristics in the extracted set of characteristics.

5. The apparatus of claim 4, wherein, to determine whether the extracted set of characteristics meets the predefined similarity threshold, the instructions cause the processor to:
   determine whether the extracted set of characteristics with the weights applied on at least one of the characteristics meets the predefined similarity threshold; and
   based on a determination that the extracted set of characteristics with the weights applied on at least one of the characteristics meets that predefined similarity threshold with respect to a previously identified set of characteristics, assign the device with the certain device type.

6. The apparatus of claim 1, wherein the instructions cause the processor to:
   determine whether the extracted set of characteristics meets the predefined similarity threshold based on a Jaccard similarity determination between the extracted set of characteristics and the previously identified set of characteristics.

7. The apparatus of claim 1, wherein the instructions cause the processor to:
   generate a mapping of a plurality of devices according to the device types of the extracted set of characteristics and previously identified sets of characteristics; and
   output the generated mapping of the plurality of devices.

8. The apparatus of claim 1, wherein the instructions cause the processor to:
   based on a determination that the extracted set of characteristics does not meet the predefined similarity threshold, add the extracted set of characteristics as an entry into a row of a table, wherein the previously identified set of characteristics is listed in another row of the table.

9. A method comprising:
receiving, by a processor, data pertaining to a network interaction by an Internet of Things (IoT) device;
extracting, by the processor, a set of features associated with the interaction from the received data;
accessing, by the processor, a plurality of previously identified sets of features corresponding to other IoT devices, the plurality of previously identified sets of features being assigned with respective device types;
determining, by the processor, whether the extracted set of features is similar to any of the previously identified sets of features within a predefined similarity threshold; and
based on a determination that the extracted set of features does not meet the predefined similarity threshold with respect to any of the plurality of previously identified sets of features,
  querying, by the processor, a knowledge graph for identification of a cluster of features that includes at least some of the extracted set of characteristics, wherein the cluster of features is one of a plurality of clusters of features in the knowledge graph, and wherein each of the plurality of clusters of features includes a device type; and
  assigning, by the processor, the device type in the cluster of features that most closely meets the query as the device type of the device.

10. The method of claim 9, further comprising:
based on a determination that the extracted set of features meets the predefined similarity threshold of a certain previously identified set of features, assigning the extracted set of features corresponding to the IoT device with the device type of the certain previously identified set of features.

11. The method of claim 9, further comprising:
based on a determination that the extracted set of features does not meet the predefined similarity threshold with respect to any of the previously identified sets of features, adding the extracted set of features as an entry into a row of a table, wherein the plurality of previously identified sets of features are listed in other rows of the table.

12. The method of claim 9, further comprising:
querying the knowledge graph for identification of a cluster of features that includes at least some of the features having the highest weights.

13. The method of claim 9, further comprising:
identifying weights to be applied to at least one of the features in the extracted set of features, wherein the weights correspond to levels at which the features are relevant in identifying a device type of the device; and
applying the weights on at least one of the features in the extracted set of features.

14. The method of claim 9, further comprising:
constructing the knowledge graph to include the extracted set of features and the plurality of previously identified sets of features, wherein the features are arranged in respective clusters, wherein each of the respective clusters corresponds to an interaction between an IoT device and another device, and wherein the features in each of the clusters is linked to other features in the cluster based on weights assigned to the features.

15. The method of claim 14, further comprising:
constructing the knowledge graph to include respective device types assigned to each of the clusters of features.

16. A non-transitory computer-readable medium on which is stored machine-readable instructions that when executed by a processor, cause the processor to:
  construct a table that includes rows of features, wherein each of the features in the rows of features corresponds to a feature of a communication over a network by an Internet of Things (IoT) device and an indication of a device type of the IoT device;
  construct a knowledge graph that includes clusters of features, each cluster of features including a plurality of nodes corresponding to an IoT device, wherein each of the plurality of nodes identifies a feature of a communication over the network by an IoT device, and wherein one of the features in each of the clusters of features is a device type assigned to the cluster of features; and
  for each of the clusters, interconnect features that have at least a predefined minimum weight with links, wherein the weights correspond to levels at which features are relevant to an identification of device types of the IoT devices.

17. The computer-readable medium of claim 16, wherein the instructions further cause the processor to:
receive an additional feature from a user regarding a particular cluster of features; and
add the additional feature as a node in the particular cluster of features.

18. The computer-readable medium of claim 16, wherein the instructions further cause the processor to:
receive data pertaining to a network communication of a newly detected IoT device;
extract a set of features associated with the network communication from the received data;
determine whether the extracted set of features meets a predefined similarity threshold with respect to any of the rows of features in the constructed table; and
based on a determination that the extracted set of features meets the predefined similarity threshold with respect to a certain row of features, assign the newly detected IoT device with the device type of the certain row of features.

19. The computer-readable medium of claim 18, wherein the instructions further cause the processor to:
based on a determination that the extracted set of features fails to meet the predefined similarity threshold with respect to any of the rows of features,
  query the knowledge graph for identification of a cluster of features that includes at least some of the extracted set of features, wherein the cluster of features is one of a plurality of clusters of features in the knowledge graph, and wherein each of the plurality of clusters of features includes a device type.

20. The computer-readable medium of claim 19, wherein the instructions further cause the processor to:
assign the device type in the cluster of features that most closely meets the extracted set of features as the device type of the device.

* * * * *